(12) United States Patent
Tomizawa et al.

(10) Patent No.: US 9,321,322 B2
(45) Date of Patent: Apr. 26, 2016

(54) VEHICLE IN WHICH LEFT AND RIGHT WHEELS ARE ATTACHED TO VEHICLE BODY BY SUB-FRAME MODULE

(71) Applicant: Fuji Jukogyo Kabushiki Kaisha, Tokyo (JP)

(72) Inventors: Hidehisa Tomizawa, Tokyo (JP); Toshi Ishida, Tokyo (JP); Yoshiaki Utsugi, Tokyo (JP); Kazuya Ando, Tokyo (JP); Masaru Kogure, Tokyo (JP); Toshiyuki Hyuga, Tokyo (JP); Kensuke Ohshima, Tokyo (JP); Naoto Yabuki, Tokyo (JP); Hiromi Tamou, Tokyo (JP)

(73) Assignee: FUJI JUKOGYO KABUSHIKI KAISHA, Shibuya-Ku, Tokyo (JP)

( * ) Notice: Subject to any disclaimer, the term of this patent is extended or adjusted under 35 U.S.C. 154(b) by 0 days.

(21) Appl. No.: 14/669,946

(22) Filed: Mar. 26, 2015

(65) Prior Publication Data

US 2015/0273973 A1 Oct. 1, 2015

(30) Foreign Application Priority Data

Mar. 28, 2014 (JP) .................................. 2014-068115

(51) Int. Cl.
*B60G 21/055* (2006.01)
*B60G 3/20* (2006.01)

(52) U.S. Cl.
CPC ............. *B60G 21/0551* (2013.01); *B60G 3/20* (2013.01); *B60G 21/055* (2013.01); *B60G 2200/144* (2013.01); *B60G 2204/122* (2013.01); *B60G 2204/15* (2013.01)

(58) Field of Classification Search
CPC ............. B60G 21/055; B60G 21/0551; B60G 2204/1222; B60G 2204/15; B60G 2202/135; B60G 3/20; B60G 2204/122; B60G 2200/144
See application file for complete search history.

(56) References Cited

U.S. PATENT DOCUMENTS

| 4,113,278 | A | * | 9/1978 | Rissberger | B60G 21/0551 280/124.106 |
| 4,152,011 | A | * | 5/1979 | Sano | B60G 7/04 267/278 |
| 5,833,026 | A | * | 11/1998 | Zetterstrom | B60G 3/202 180/360 |
| 6,547,894 | B1 | * | 4/2003 | Smith | B60G 21/055 148/521 |
| 6,869,090 | B2 | * | 3/2005 | Tatsumi | B60G 3/20 280/124.109 |

(Continued)

FOREIGN PATENT DOCUMENTS

| JP | H11-278298 A | 10/1999 |
| JP | 2007-326529 | 12/2007 |

(Continued)

OTHER PUBLICATIONS

Japanese Office Action dated Jun. 16, 2015 issued in corresponding Japanese Patent Application No. 2014-068115.

*Primary Examiner* — Laura Freedman
(74) *Attorney, Agent, or Firm* — Troutman Sanders LLP (57) ABSTRACT

In a sub-frame module that is used to attach a set of left and right wheels in pair to a vehicle body, a sub-frame attached to the vehicle body and left and right hub carriers, to which the left and right wheels in pair are attached, are connected by left and right link arms to be capable of swinging. A stabilizer is laid across the left and right rear link arms, and a holder that holds the stabilizer is supported by an vehicle body side member that is provided in a bush attached to the vehicle body. The holder is fixed to the vehicle body by attaching the vehicle body side member to the vehicle body.

16 Claims, 7 Drawing Sheets

(56) References Cited

U.S. PATENT DOCUMENTS

| | | | |
|---|---|---|---|
| 6,923,474 B2 * | 8/2005 | Frasch | B60G 21/0551 180/312 |
| 7,726,672 B2 * | 6/2010 | Yamagishi | B60G 21/0551 280/124.109 |
| 8,505,940 B1 * | 8/2013 | Hufnagle | B60G 21/0551 280/124.13 |
| 8,746,718 B2 * | 6/2014 | Otani | B60G 7/02 280/124.109 |

FOREIGN PATENT DOCUMENTS

| | | |
|---|---|---|
| JP | 2007-326529 A | 12/2007 |
| JP | 2008-001307 A | 1/2008 |

* cited by examiner

VEHICLE IN WHICH LEFT AND RIGHT WHEELS ARE ATTACHED TO VEHICLE BODY BY SUB-FRAME MODULE

CROSS-REFERENCE TO RELATED APPLICATIONS

The present application claims priority from Japanese Patent Application No. 2014-068115, filed on Mar. 28, 2014, the entire contents of which are hereby incorporated by reference.

BACKGROUND

1. Technical Field

The present invention relates to a vehicle in which left and right wheels are attached to a vehicle body by a sub-frame module.

2. Related Art

A vehicle such as an automobile employs a structure in which, for example, a rear sub-frame module is attached to a lower side of a pair of rear side frames of a vehicle body, and left and right wheels are attached to the rear sub-frame module (Japanese Unexamined Patent Application Publication (JP-A) No. 2007-326529).

By employing this structure, components such as the left and right wheels, for example, can be integrated with the rear sub-frame module, whereupon the integrated rear sub-frame module can be attached to the vehicle body in a single operation. In this case, the rear sub-frame module may be attached to the vehicle body during an operation of a main vehicle body assembly line on which various components are attached to the vehicle body. In so doing, components such as the wheels no longer need to be attached to the vehicle body individually on the main vehicle body assembly line, and as a result, the productivity of the vehicle body can be improved.

When the rear sub-frame module is attached to the vehicle body in this manner, however, a bush capable of elastic deformation must be provided between the rear side frame of the vehicle body and the rear sub-frame module to prevent direct contact between the metal rear side frame and the metal rear sub-frame module, for example. As a result, relative movement occurs between the vehicle body and the rear sub-frame module, making the vehicle body more likely to roll to the left and right.

In JP-A No. 2007-326529, therefore, a stabilizer supported by a sub-frame is laid across left and right link arms of the sub-frame module. By providing the stabilizer, the left and right link arms are less likely to move in opposite phases and more likely to move in identical phases when the vehicle body rolls to the left and right. As a result, left-right rolling of the vehicle body can be suppressed.

However, when the stabilizer is supported by the sub-frame, as in JP-A No. 2007-326529, the stabilizer is attached to the vehicle body via the elastically deformable bush provided between the sub-frame and the vehicle body. Hence, relative movement occurs between the vehicle body and the stabilizer, albeit in a smaller amount than when the stabilizer is not provided, and as a result, the vehicle body rolls to the left and right. It is therefore difficult to suppress rolling of the vehicle body effectively using a stabilizer.

Hence, in a vehicle in which left and right wheels are attached to a vehicle body by a sub-frame module, demand exists for a method of effectively suppressing rolling of the vehicle body without diminishing an effect of improving the productivity of the vehicle body, which is obtained by employing the sub-frame module.

SUMMARY OF THE INVENTION

An aspect of the present invention provides a vehicle in which left and right wheels are attached to a vehicle body by a sub-frame module, including a vehicle body and a sub-frame module attached to the vehicle body. In the vehicle, one set of left and right wheels in pair is attached to the vehicle body interposing by the sub-frame module. The sub-frame module includes: a sub-frame attached to the vehicle body; left and right hub carriers to which the left and right wheels in pair are respectively attached; left and right link arms that extend leftward and rightward from the sub-frame and connect the left and right hub carriers to left and right sides of the sub-frame to be capable of swinging; a stabilizer attached so as to lie across the left and right hub carriers or the left and right link arms; a holder that holds the stabilizer; and a bush that is capable of elastic deformation and interposed between the sub-frame and the vehicle body in a position where the sub-frame is attached to the vehicle body. The bush includes a vehicle body side member that is fixed to the vehicle body when the sub-frame is attached to the vehicle body. The holder holding the stabilizer is supported by the vehicle body side member of the bush provided on the sub-frame module, and fixed to the vehicle body by attaching the vehicle body side member to the vehicle body.

The vehicle may further include a bracket that is supported by the vehicle body side member of the bush or a bracket that is attached to the vehicle body together with the vehicle body side member, and the holder holding the stabilizer may be attached to the bracket.

The vehicle body side member provided in the bush and attached to the vehicle body may have a tubular shape into which an attachment member for attaching the sub-frame to the vehicle body can be inserted. The bush may further include an outer tube disposed around the tubular vehicle body side member, and an elastic member that is charged between the tubular vehicle body side member and the outer tube so as to integrate the vehicle body side member with the outer tube. The bracket may be supported by the tubular vehicle body side member.

The tubular vehicle body side member may project above and below the outer tube. At least either one of an upper stopper provided on an upwardly projecting upper end of the tubular vehicle body side member in order to restrict upward swinging of the outer tube, and a lower stopper provided on a downwardly projecting lower end of the tubular vehicle body side member in order to restrict downward swinging of the outer tube may be provided. The bracket may be attached to at least either one of the provided upper stopper and lower stopper.

Both the upper stopper and the lower stopper may be provided, and the bracket may be attached to each of the upper stopper and the lower stopper.

The bush may be provided in a plurality arranged on the sub-frame in a left-right direction. The holder holding the stabilizer and the bracket may be provided in a plurality of sets corresponding to the plurality of bushes arranged in the left-right direction. The brackets may be connected to each other by a connecting member that extends in the left-right direction.

The vehicle may further include left and right suspensions that stand upright on the left and right hub carriers or the left and right link arms such that respective upper ends thereof are attached to the vehicle body.

DETAILED DESCRIPTION

An implementation of the present invention will be described below on the basis of the drawings.

Figure 1:
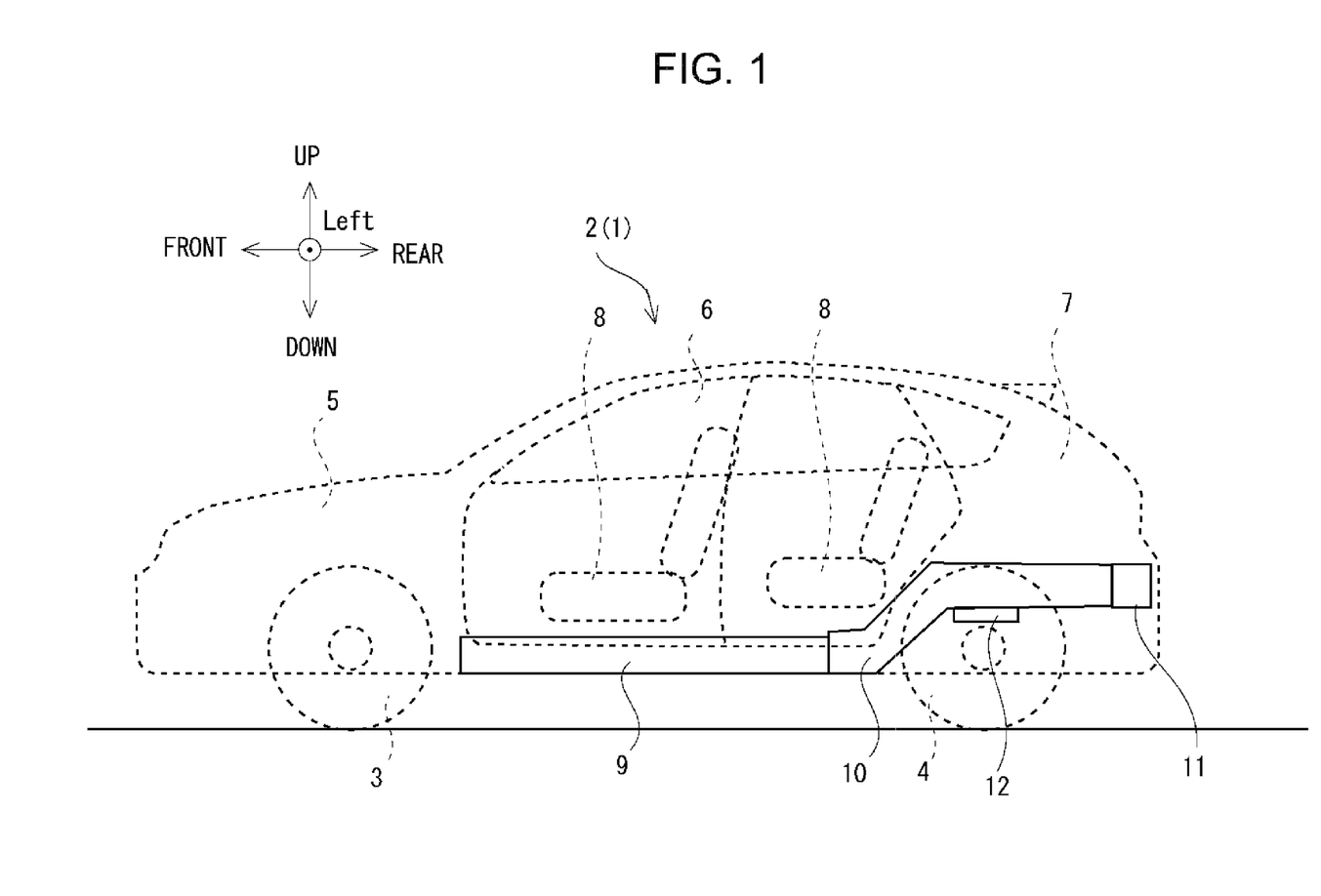
FIG. 1 is a schematic perspective side view illustrating an automobile according to an implementation of the present invention.

FIG. 1 is a schematic perspective side view illustrating an automobile 1 according to an implementation of the present invention.

The automobile 1 in FIG. 1 may be, for example, a gasoline automobile that uses an internal combustion engine, an electric automobile, or a hybrid automobile combining a gasoline automobile and an electric automobile.

The automobile 1 includes a vehicle body 2, and front wheels 3 and rear wheels 4 attached to left and right sides of the vehicle body 2. The automobile 1 is an example of a vehicle that travels along a road surface using the wheels 3 and 4.

The vehicle body 2 of FIG. 1 is divided by a frame serving as a skeleton thereof into a front compartment 5, a passenger compartment 6, and a luggage compartment 7. An engine and a motor, for example, are disposed in the front compartment 5. Seats 8 on which passengers sit are disposed in front and rear rows in the passenger compartment 6. A spare tire, a battery, and so on can be housed in the luggage compartment 7.

FIG. 1 illustrates, as the skeleton of the vehicle body 2, side sills 9 that extend in a front-rear direction respectively along left and right sides of a floor panel defining a floor surface of the passenger compartment 6, a left-right pair of rear side frames 10 extending from respective rear ends of the side sills 9 to a rear end of the vehicle body 2, and a rear bumper beam 11 that connects respective rear ends of the left-right pair of rear side frames 10 to each other.

A rear sub-frame module 12 is attached to a lower side of the floor surface of the vehicle body 2. More specifically, the rear sub-frame module 12 is fixed to a lower side of the left-right pair of rear side frames 10 of the vehicle body 2. The left and right rear wheels 4 in pair are supported rotatably by the rear sub-frame module 12. The left and right rear wheels 4 are attached to the vehicle body 2 via the rear sub-frame module 12.

Figure 2:
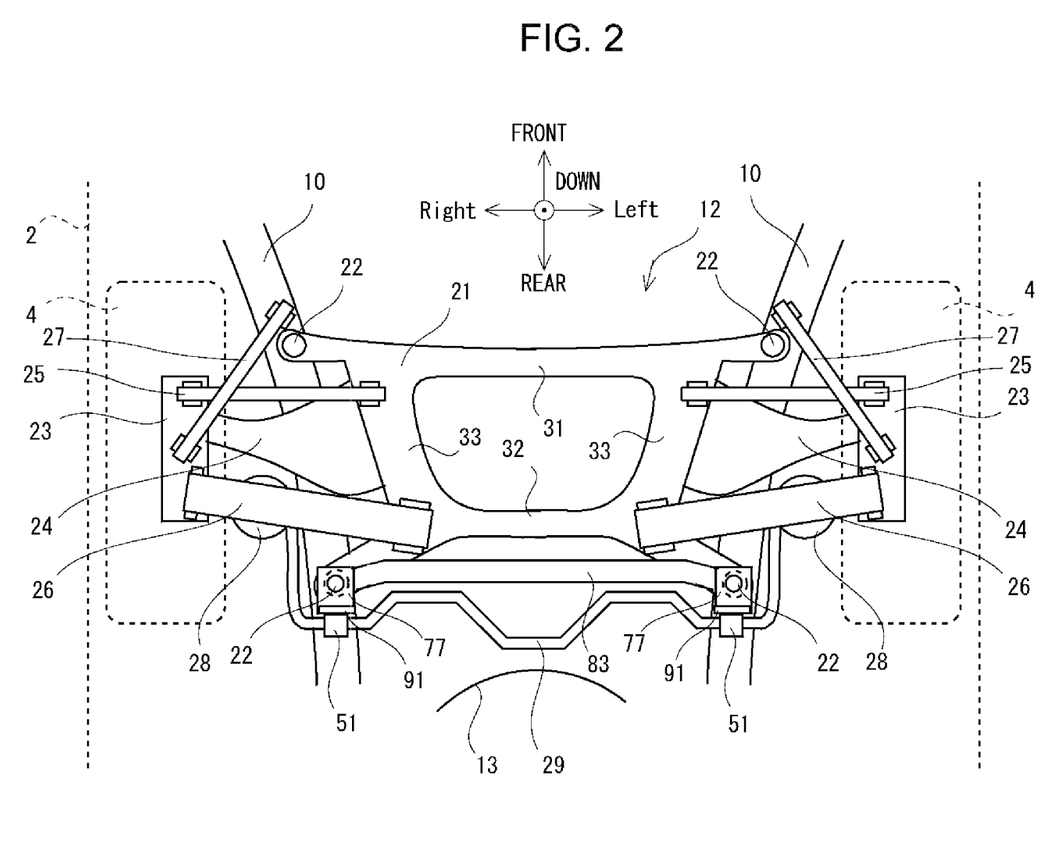
FIG. 2 illustrates a rear sub-frame module attached to a floor surface of a vehicle body illustrated in FIG. 1 from below.

FIG. 2 illustrates the rear sub-frame module 12 attached to the floor surface of the vehicle body 2 illustrated in FIG. 1 from below.

FIG. 2 illustrates the rear sub-frame module 12 and the left-right pair of rear side frames 10 provided in a rear portion of the vehicle body 2. Further, a part of a tire house 13 of the vehicle body 2 is illustrated on a rear side of the rear sub-frame module 12. Various components are disposed densely around the rear sub-frame module 12, and therefore the rear sub-frame module 12 must be attached to the vehicle body 2 within a limited space.

The rear sub-frame module 12 illustrated in FIG. 2 includes a sub-frame 21 attached to the vehicle body 2, a plurality of bushes 22, left and right hub carriers 23 to which the left and right rear wheels 4 are respectively attached, left and right upper arms 24, left and right front lower links 25, left and right rear lower links 26, left and right trailing links 27, left and right suspensions 28, and a stabilizer 29.

The rear sub-frame module 12 is attached to the vehicle body 2 in a single operation after assembling these components.

The sub-frame 21 is attached to the vehicle body 2. The sub-frame 21 of FIG. 1 includes a front cross frame 31 and a rear cross frame 32 extending in a left-right direction, and a plurality of front-rear frames 33 connecting the front cross frame 31 and the rear cross frame 32 in the front-rear direction. The sub-frame 21 requires high rigidity. Therefore, the front cross frame 31, rear cross frame 32, and plurality of front-rear frames 33 constituting the sub-frame 21 are formed integrally from a similar metallic material to the vehicle body 2.

The bushes 22 are provided on respective ends of the front cross frame 31 and respective ends of the rear cross frame 32. The respective ends of the front cross frame 31 and the respective ends of the rear cross frame 32 are attached to the left-right pair of rear side frames 10 by the bushes 22. Bushes 22 are provided side by side in the left-right direction on the front cross frame 31 and the rear cross frame 32 of the sub-frame 21.

The bushes 22 are capable of elastic deformation in an up-down direction of the vehicle body 2. The sub-frame 21 is fixed to the floor of the vehicle body 2 via the elastically deformable bushes 22. Hence, there is no need to attach the metal sub-frame 21 directly to the metal rear side frames 10, for example. As a result, a scraping noise is less likely to occur.

The hub carriers 23 support the rear wheels 4 rotatably. The hub carriers 23 move up and down together with the rear wheels 4 in response to travel conditions of the vehicle body 2. Further, brake mechanisms and so on are attached to the hub carriers 23. When the automobile 1 is a four wheel drive vehicle, a rear drive shaft, not illustrated, is attached between the left and right hub carriers 23. The rear wheels 4 are attached to left and right ends of the rear drive shaft.

The upper arms 24, the front lower links 25, and the rear lower links 26 extend in the left-right direction from the sub-frame 21 so as to connect the hub carriers 23 to the left and right sides of the sub-frame 21 to be capable of swinging.

The upper arms 24 are attached rotatably to an upper surface of the sub-frame 21 at one end, and attached rotatably to respective upper portions of the hub carriers 23 at another end.

The front lower links 25 are attached rotatably to a lower surface of the sub-frame 21 at one end, and attached rotatably to respective lower portions of the hub carriers 23 at another end.

The rear lower links 26 are attached rotatably to the lower surface of the sub-frame 21 at one end, and attached rotatably to the respective lower portions of the hub carriers 23 at another end.

The rear lower links 26 are attached between the sub-frame 21 and the hub carriers 23 in positions rearward of the front lower links 25. The upper arms 24 are attached between the sub-frame 21 and the hub carriers 23 in positions between the front lower links 25 and the rear lower links 26.

By attaching the hub carriers 23 to the left and right sides of the sub-frame 21 using a link mechanism constituted by the upper arms 24, the front lower links 25, and the rear lower links 26, the hub carriers 23 can be maintained in an upright attitude in an up-down direction even when the hub carriers 23 swing in the up-down direction relative to the sub-frame 21.

The trailing links 27 extend in a frontward direction from the hub carriers 23. The trailing links 27 are attached rotatably to the rear side frames 10 of the vehicle body 2 at one end, and attached rotatably to the hub carriers 23 at another end. As a result, the rear wheels 4 and hub carriers 23 can swing in a rotation direction centering on one end (a front end) of the trailing links 27.

Figure 3:
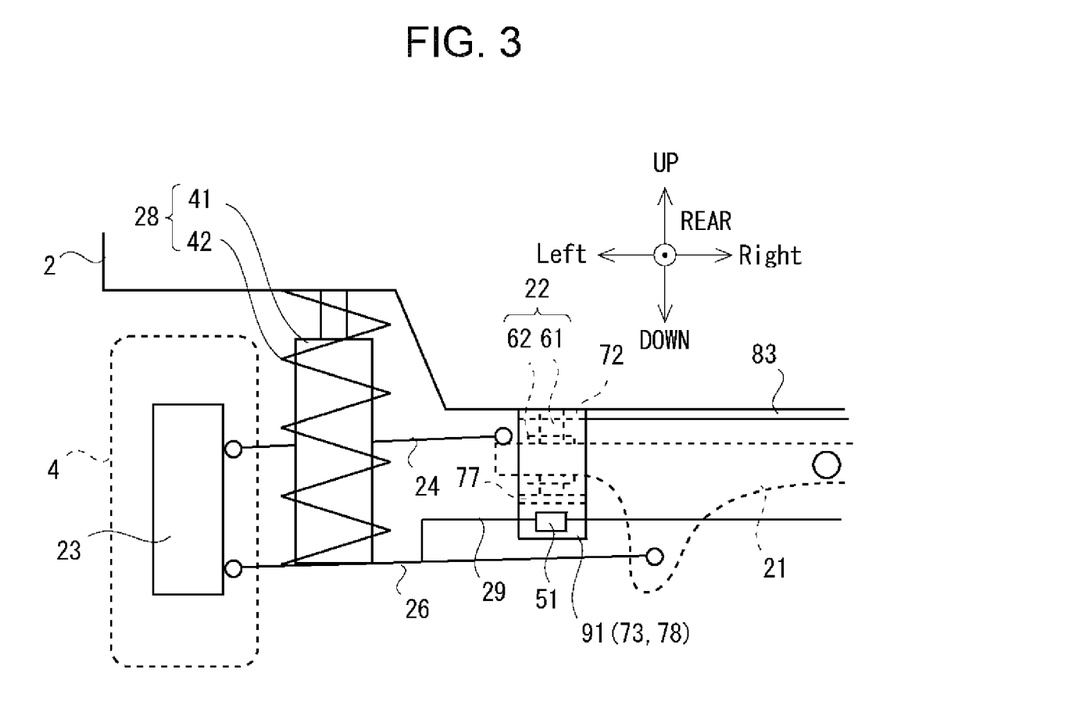
FIG. 3 is a partial illustrative view illustrating the rear sub-frame module of FIG. 2 from behind.

The suspensions 28, as illustrated in FIG. 3 to be described below, each include a damper 41 that suppresses up-down movement, and a coil 42 wound around the damper 41 in an axial direction of the damper 41. The suspensions 28 are attached to the rear lower links 26 in an upright attitude at a lower end, and attached to the vehicle body 2 at an upper end.

By providing the suspensions 28 to stand upright between the rear lower links 26 and the vehicle body 2 in this manner, the suspensions 28 can suppress up-down movement of the rear wheels 4 and the hub carriers 23 in response to input from a road surface. As a result, the vehicle body 2 is stabilized during travel.

Note that the suspensions 28 may be attached in an upright attitude to the front lower links 25 or the upper arms 24, for example, at the lower end instead of the rear lower links 26. Further, the suspensions 28 may be attached in an upright attitude to the hub carriers 23 at the lower end instead of the link arms.

As illustrated in FIG. 2, the rear sub-frame module 12 is fixed to the lower side of the pair of rear side frames 10 of the vehicle body 2. In the case of FIG. 2, the sub-frame 21 is attached to the vehicle body 2 by the plurality of bushes 22, the upper ends of the plurality of suspensions 28 are attached to the vehicle body 2, and the trailing links 27 are attached to the vehicle body 2. By performing these operations, the rear sub-frame module 12 is attached to the vehicle body 2. The left and right rear wheels 4 can thus be attached to the vehicle body 2.

By employing a structure using the rear sub-frame module 12, the rear sub-frame module 12 can be attached to the vehicle body 2 on a main assembly line of the vehicle body 2, on which various parts are attached to the vehicle body 2. There is therefore no need to attach components such as the rear wheels 4 to the vehicle body 2 individually on the main assembly line of the vehicle body 2, and as a result, the productivity of the vehicle body 2 can be improved.

However, when the rear wheels 4 are attached to the vehicle body 2 using the rear sub-frame module 12, the rear sub-frame module 12 is attached to the rear side frames 10 via the plurality of elastically deformable bushes 22. As a result, relative movement occurs between the vehicle body 2 and the stabilizer 29 during a turn, for example, making the vehicle body 2 more likely to roll to the left and right. Hence, the vehicle body 2 rolls relative to the rear sub-frame module 12, leading to a reduction in a roll stiffness of the vehicle body 2.

In response to this problem, for example, the stabilizer 29 may be laid across and attached to the left and right rear lower links 26, and then attached to the vehicle body 2 so as to be supported thereby. Note that the stabilizer 29 may also be laid across the left and right hub carriers 23.

By providing the stabilizer 29, the left and right rear wheels 4 and the left and right hub carriers 23 attached to the tip of the left and right rear lower links 26 are less likely to move up and down in opposite phases and more likely to move in-phase about the vehicle body 2. Accordingly, the vehicle body 2 is less likely to roll to the left and right, and as a result, the vehicle body 2 can be stabilized easily.

In a case where the stabilizer 29 is fixed directly to the vehicle body 2, however, a separate operation to attach the stabilizer 29 to the vehicle body 2 must be performed in addition to the operations described above when attaching the rear sub-frame module 12 to the vehicle body 2. As a result, the number of steps in which components are directly attached to the vehicle body 2 increases such that the effect of improving the productivity of the vehicle body 2 by employing the rear sub-frame module 12 is diminished. Further, since the tire houses 13 and so on are disposed on the periphery of the part of the vehicle body 2 to which the rear sub-frame module 12 is attached, almost no extra space is available, and yet extra space must be secured under this limitation to attach the stabilizer 29. As a result, a further hindrance may arise during design of the vehicle body 2.

Hence, in the automobile 1, in which the left and right rear wheels 4 are attached to the vehicle body 2 using the rear sub-frame module 12, demand exists for a method of effectively suppressing rolling of the vehicle body 2 without diminishing the effect of improving the productivity of the vehicle body 2, which is obtained by employing the rear sub-frame module 12.

In this implementation, therefore, the stabilizer 29 is supported by the rear sub-frame module 12 rather than being directly attached and fixed to the vehicle body 2. At this time, a holder 51 holding the stabilizer 29 is supported by inner tubes 61 of the bushes 22. The inner tubes 61 of the bushes 22 are fixed to the vehicle body 2 when the rear sub-frame module 12 is attached to the vehicle body 2.

In so doing, the stabilizer 29 can be fixed to the vehicle body 2 without the need for an operation to attach the stabilizer 29 to the vehicle body 2 directly. Accordingly, relative movement between the vehicle body 2 and the stabilizer 29 can be effectively reduced, making the vehicle body 2 less likely to roll to the left and right. As a result, the vehicle body 2 can be stabilized easily. This is described in detail below.

FIG. 3 is a partial illustrative view illustrating the rear sub-frame module 12 of FIG. 2 from behind. FIG. 3 illustrates a left half of the rear sub-frame module 12 and a left side lower portion of the vehicle body 2.

Figure 4:
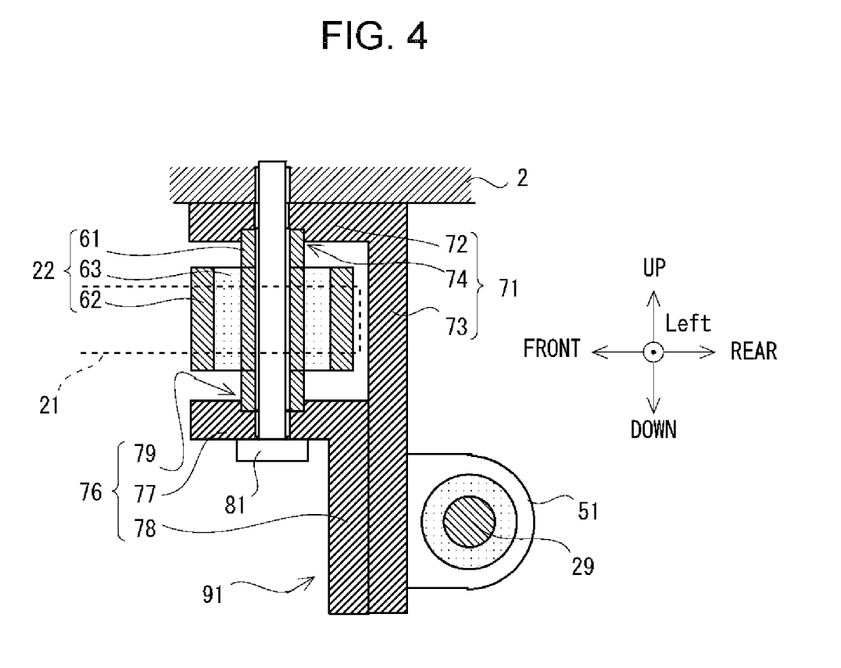
FIG. 4 is a schematic partial longitudinal sectional view illustrating a part in which the rear sub-frame module of FIG. 2 is fixed to the vehicle body.

FIG. 4 is a schematic partial longitudinal sectional view illustrating a part in which the rear sub-frame module 12 of FIG. 2 is fixed to the vehicle body 2. FIG. 4 illustrates the bush 22 of the rear sub-frame module 12 and a periphery thereof. FIG. 4 also illustrates the floor surface of the vehicle body 2. Hence, FIG. 4 is a partial longitudinal sectional view illustrating apart of the periphery of the bush 22 from the left side of the vehicle body 2.

In the rear sub-frame module 12 of FIG. 4, the bush 22 includes the inner tube 61, which is fixed to the vehicle body 2, an outer tube 62, and an elastic member 63. FIG. 4 also illustrates an upper clamp 71 and a lower clamp 76. Further, FIG. 3 illustrates a connecting member 83 that connects a left-right pair of the upper clamps 71 to each other, as illustrated in FIG. 2.

The inner tube 61 is a metallic, elongated, cylindrical pipe, for example. An attachment member 81 such as a screw, for example, is inserted into the inner tube 61. When the sub-frame 21 is attached to the floor surface of the vehicle body 2, the inner tube 61 is fixed to the vehicle body 2 by the attachment member 81. The inner tube 61 is fixed to the lower surface of the floor of the vehicle body 2 so as to extend in the up-down direction of the vehicle body 2.

The outer tube 62 is formed in a cylindrical shape having a larger diameter than the inner tube 61. The inner tube 61 is inserted into the outer tube 62 and disposed therein. Accordingly, the outer tube 62 is disposed on the periphery of the inner tube 61.

The elastic member 63 is formed from an elastic material such as rubber, for example. The elastic member 63 is charged between the inner tube 61 and the outer tube 62. As a result, the inner tube 61 and the outer tube 62 are integrated. Further, the inner tube 61 projects from either end of the outer tube 62.

The upper clamp 71 includes an upper stopper 72 and an upper bracket portion 73. The upper stopper 72 is substantially plate-shaped, and an upper recess 74 for inserting an upper end of the inner tube 61 is provided in a lower surface thereof. The upper bracket portion 73 extends downward from one end of the substantially plate-shaped upper stopper 72. Hence, the upper clamp 71 is formed to have a substantially L-shaped cross-section.

The lower clamp 76 includes a lower stopper 77 and a lower bracket portion 78. The lower stopper 77 is substantially plate-shaped, and a lower recess 79 for inserting a lower end of the inner tube 61 is provided in an upper surface thereof. The lower bracket portion 78 extends downward from one end of the substantially plate-shaped lower stopper 77. Hence, the lower clamp 76 is formed to have a substantially L-shaped cross-section.

The downwardly extending upper bracket portion 73 and the downwardly extending lower bracket portion 78 overlap. The overlapping upper bracket portion 73 and lower bracket portion 78 together form a bracket 91 in which the upper stopper 72 and the lower stopper 77 are integrated.

Further, the inner tube 61 is sandwiched between the upper stopper 72 and the lower stopper 77. The inner tube 61 is press-fitted between the upper stopper 72 and the lower stopper 77. As a result, the outer tube 62 integrated with the inner tube 61 by the elastic member 63 is capable of swinging up and down relative to the inner tube 61 between the upper stopper 72 and the lower stopper 77. The up-down swinging motion of the outer tube 62 can be restricted by the upper stopper 72 and the lower stopper 77. Furthermore, the upper stopper 72 and the lower stopper 77 can be prevented from falling away from the inner tube 61 before the rear sub-frame module 12 is attached to the vehicle body 2. Hence, the stabilizer 29 can be positioned during assembly of the rear sub-frame module 12.

Moreover, as illustrated in FIG. 3, the bracket 91 formed by the overlapping upper bracket portion 73 and lower bracket portion 78 is positioned on the rear side of the outer tube 62 when the sub-frame 21 is attached to the floor surface of the vehicle body 2. The holder 51 holding the stabilizer 29 is then attached to a rear surface of the upper bracket portion 73.

Further, as illustrated in FIG. 2, the holder 51 holding the stabilizer 29 and the bracket 91 are provided in a plurality of sets corresponding to the plurality of bushes 22 arranged in the left-right direction. In FIG. 2, two sets are provided.

The stabilizer 29 is supported in locations near left and right ends thereof by the inner tubes 61 of the left and right bushes 22 via the holders 51 and the brackets 91.

Hence, the stabilizer 29 is supported by the inner tubes 61 of the bushes 22 in the rear sub-frame module 12 prior to attachment to the vehicle body 2. As a result, the stabilizer 29 remains stable in a fixed position.

Furthermore, as illustrated in FIG. 4, the stabilizer 29 is fixed directly to the vehicle body 2 by attaching the inner tubes 61 of the bushes 22 to the vehicle body 2.

Further, the upper stoppers 72 of the left-right pair of upper clamps 71 are connected to each other by the connecting member 83 extending in the left-right direction, as illustrated in FIG. 2. Thus, the upper clamps 71 and the overlapping lower clamps 76 can be prevented from rotating about the inner tubes 61 of the bushes 22.

Therefore, when the upper stoppers 72 and lower stoppers 77 are attached to the vehicle body 2 together with the inner tubes 61 of the bushes 22, the upper stoppers 72 and lower stoppers 77 are unlikely to rotate together with the attachment members 81 that are fastened by rotation. Once the rear sub-frame module 12 is attached to the vehicle body 2, the attitudes of the holders 51 and the brackets 91 supporting the stabilizer 29 can be maintained such that the stabilizer 29 extends in the left-right direction.

Next, rolling behavior of the vehicle body 2 having the features illustrated in FIGS. 1 to 4 will be described.

Figure 5A:
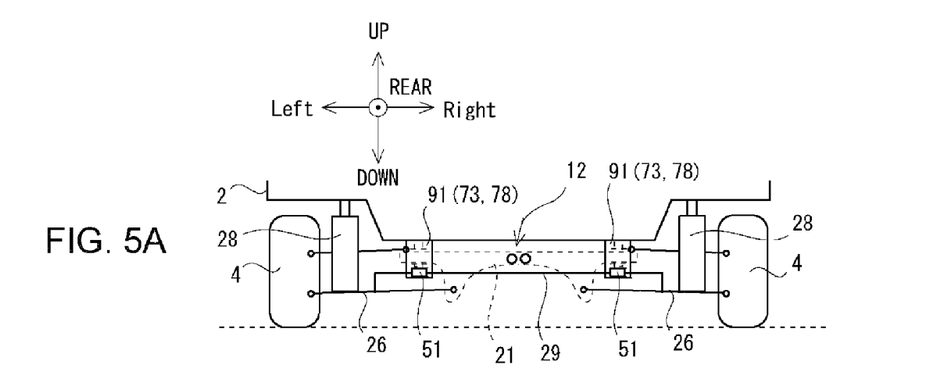
FIGS. 5A-5C illustrate behavior of the vehicle body according to this implementation when the automobile of FIG. 1 rolls in a left-right direction.
Figure 5B:
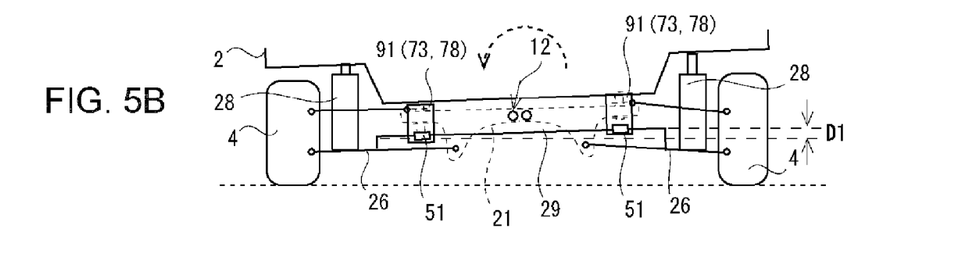
Figure 5C:
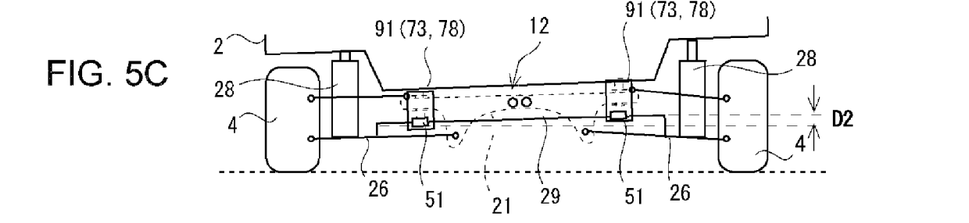

FIGS. 5A-5C illustrate g behavior of the vehicle body 2 according to this implementation when the automobile 1 of FIG. 1 rolls in the left-right direction.

Before the automobile 1 starts to turn in response to a steering operation, for example, the vehicle body 2 is substantially horizontal in the left-right direction, as illustrated in FIG. 5A. The rear sub-frame module 12 attached to the vehicle body 2 is likewise substantially horizontal in the left-right direction. When the road surface is flat, the left and right suspensions 28 expand and contract in a substantially identical manner. Accordingly, identical forces act on the respective ends of the stabilizer 29 in accordance with the substantially in-phase movement of the left and right suspensions 28.

When the automobile 1 starts to turn, the vehicle body 2 starts to tilt toward a rotational outer side, as illustrated in FIG. 5B. In FIG. 5B, the vehicle body 2 starts to tilt toward a left side of the drawing. The sub-frame 21 tilts in an identical fashion to the vehicle body 2 integrally with the vehicle body 2. Hence, positions of the left and right ends of the stabilizer 29 deviate from each other in the up-down direction. In FIG. 5B, the left end of the stabilizer 29 on the rotational outer side becomes lower than the right end. As a result, different forces act on the left and right ends of the tilting stabilizer 29.

According to this implementation, as illustrated in FIG. 5C, the vehicle body 2 is maintained in a similar attitude to that of FIG. 5B, i.e. tilting toward the rotational outer side, even when the automobile 1 continues to turn. An up-down difference D2 between the left and right ends of the stabilizer 29 in FIG. 5C is kept substantially identical to an up-down difference D1 in FIG. 5B.

Furthermore, in this implementation, the stabilizer 29 is attached directly to the vehicle body 2 by the brackets 91. When the left end of the stabilizer 29 is lower than the right end, an upward force exerted on the left end of the stabilizer 29 from the left rear lower link 26 is larger than a force exerted by the right rear lower link 26. However, these forces also act directly on the vehicle body 2, and therefore the stabilizer 29 and the sub-frame 21 do not rotate in an opposite direction to the tilt of the vehicle body 2 even when greatly differing forces are exerted on the left and right ends of the stabilizer 29. Hence, when the vehicle body 2 turns, the stabilizer 29 and the sub-frame 21 can likewise be maintained in a similar attitude to that of FIG. 5B, i.e. tilting toward the rotational outer side.

According to this implementation, therefore, the vehicle body 2 and the stabilizer 29 and sub-frame 21 can respectively be maintained in fixed attitudes as the automobile 1 turns. As a result, rolling of the vehicle body 2 is stabilized both at the start of and throughout the turn.

Next, for comparison, rolling behavior according to a comparative example in which the stabilizer 29 is supported by the sub-frame 21 rather than the vehicle body 2 will be described.

FIGS. 6A-6D illustrate behavior of the vehicle body 2 according to a comparative example in which the stabilizer 29 is supported by the sub-frame 21. In the figures, the left and right holders 51 holding the stabilizer 29 are attached to a rear surface of the sub-frame 21.

Figure 6A:
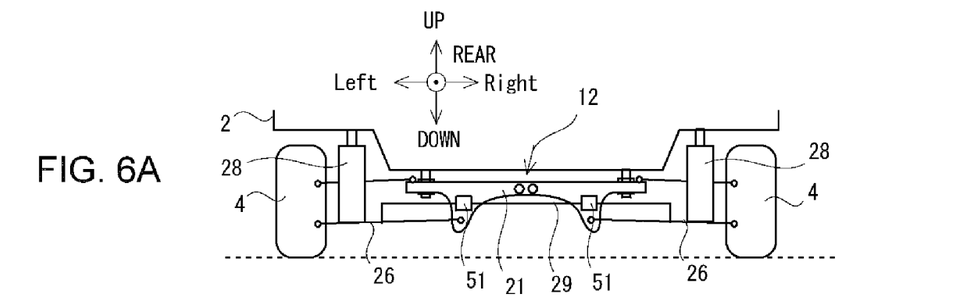
FIGS. 6A-6D illustrate behavior of the vehicle body according to a comparative example in which a stabilizer is supported by a sub-frame.

Before the automobile 1 starts to turn in response to a steering operation, for example, the vehicle body 2 is substantially horizontal in the left-right direction, as illustrated in FIG. 6A. The rear sub-frame module 12 attached to the vehicle body 2 is likewise substantially horizontal in the left-right direction. When the road surface is flat, the left and right suspensions 28 expand and contract in a substantially identical manner. Accordingly, identical forces act on the respective ends of the stabilizer 29 in accordance with the substantially in-phase movement of the left and right suspensions 28.

Figure 6B:
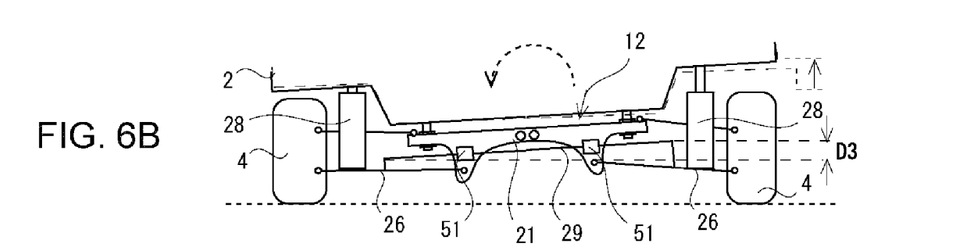

When the automobile 1 starts to turn, the vehicle body 2 starts to tilt toward the rotational outer side, as illustrated in FIG. 6B. In FIG. 6B, the vehicle body 2 starts to tilt toward a left side of the drawing. The sub-frame 21 likewise starts to tilt in accordance with the tilt of the vehicle body 2 such that the rotational outer side drops. Thereafter, even though the sub-frame 21 is stabilized by the stabilizer 29, the vehicle body 2 provided on top of the sub-frame 21 via the bushes 22, which are capable of elastic deformation relative to the sub-frame 21, continues to tilt.

Hence, when the stabilizer 29 is supported by the sub-frame 21, the vehicle body 2 tilts toward the rotational outer side by a larger amount than when the stabilizer 29 is supported directly by the vehicle body 2, as illustrated by dotted lines in FIG. 6B. Moreover, when the vehicle body 2 tilts by a large amount toward the rotational outer side, an up-down difference D3 between the left and right ends of the stabilizer 29 becomes larger than the up-down difference D1 generated when the stabilizer 29 is supported directly by the vehicle body 2.

Figure 6C:
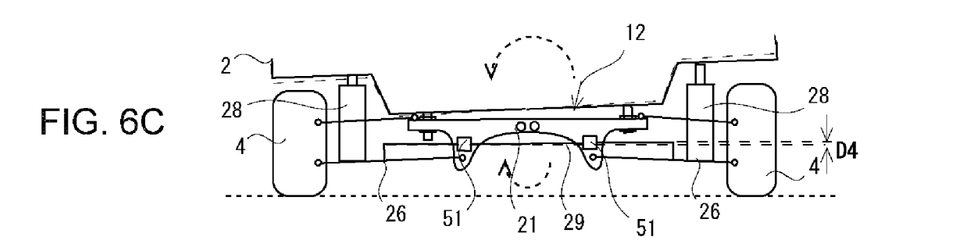

When the automobile 1 continues to turn, as illustrated in FIG. 6C, the vehicle body 2 in principle attempts to maintain a similar attitude to that of FIG. 6B, i.e. tilting toward the rotational outer side.

When the stabilizer 29 is attached to the sub-frame 21 rather than the vehicle body 2, however, the bushes 22 that are capable of elastic deformation in the up-down direction are interposed between the sub-frame 21 and the vehicle body 2. During a turn, therefore, the sub-frame 21 starts to rotate in an opposite direction, i.e. toward a rotational inner side, together with the stabilizer 29 due to the difference between the forces acting on the left and right ends of the stabilizer 29. Accordingly, an up-down difference D4 between the left and right ends of the stabilizer 29 varies so as to become smaller than the up-down difference D3 at the start of the turn.

Figure 6D:
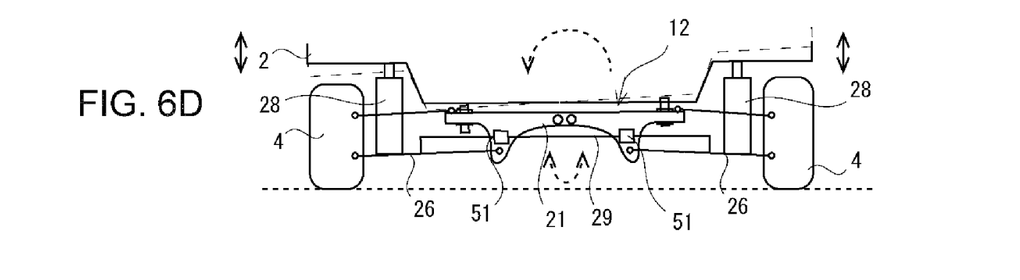

Hence, even assuming that the sub-frame 21 and the stabilizer 29 can be stabilized under the vehicle body 2 during a turn, when the stabilizer 29 and the sub-frame 21 start to rotate in opposite directions, an interval between the sub-frame 21 and the vehicle body 2 continues to vary during the turn, as illustrated in FIG. 6D, leading to variation in a roll angle of the vehicle body 2 during the turn. As a result, the roll angle of the vehicle body 2 may continue to vary during the turn.

In the comparative example, as described above, the stabilizer 29 is supported by the sub-frame 21. Therefore, firstly, a reaction force generated by the stabilizer 29 during a turn suppresses movement of the sub-frame 21, and the sub-frame 21 suppresses movement of the vehicle body 2 via the bushes 22. Hence, the roll stiffness of the vehicle body 2 is reduced directly by the up-down direction rigidity of the bushes 22, which is mainly determined in consideration of a damping performance, and as a result, the vehicle body 2 is more likely to roll.

Secondly, a reverse rotary force acts on the sub-frame 21 due to the difference between the forces acting on the left and right ends of the stabilizer 29 during the turn, causing the sub-frame 21 to vibrate. As a result, pivot points (rotational centers) of the suspensions 28 deviate from designed positions in response to input from the road surface, making it difficult to obtain a desired suspension characteristic.

Thirdly, a reverse rotary force acts on the sub-frame 21 due to the difference between the forces acting on the left and right ends of the stabilizer 29, causing the sub-frame 21 to vibrate, and as a result, the bushes 22 act as springs. Accordingly, rigid body resonance having the sub-frame 21 as a mass is excited. This vibration propagates to the vehicle body 2, causing the vehicle body 2 to vibrate.

Hence, in a case where the stabilizer 29 is supported by the sub-frame 21 rather than the vehicle body 2, as in the comparative example, the vehicle body 2 rolls greatly when the automobile 1 starts to turn. Moreover, the roll angle of the vehicle body 2 continues to vary throughout the turn. As a result, rolling of the vehicle body 2 is comparatively unstable both at the start of and throughout the turn. For example, the roll angle may vary by small amounts during a large roll.

According to the implementation described above, these behaviors can be suppressed effectively.

In the rear sub-frame module 12 according to this implementation, as described above, the holders 51 holding the stabilizer 29 are supported by the inner tubes 61 of the bushes 22, and the inner tubes 61 are attached, and thereby fixed, to the vehicle body 2.

When the rear sub-frame module 12 is attached to the vehicle body 2, therefore, the inner tubes 61 of the bushes 22 may be fixed to the vehicle body 2 such that the suspensions 28 are attached between the vehicle body 2 and the rear sub-frame module 12, for example. In so doing, the holders 51 holding the stabilizer 29 can be fixed to the vehicle body 2. Since the holders 51 holding the stabilizer 29 are fixed to the vehicle body 2, there is no need for a separate step to fix the holders 51 to the vehicle body 2. Further, the assembly constituting the rear sub-frame module 12 is not diminished in completeness. Hence, the rear sub-frame module 12 can be attached to the vehicle body 2 in a similar number of steps to another rear sub-frame module 12 in which the holders 51 are supported by the sub-frame 21, for example, and therefore favorable workability is maintained. Moreover, the stabilizer 29 can be fixed to the vehicle body 2 without increasing the number of operations required to attach the rear sub-frame module 12 to the vehicle body 2.

Furthermore, when the rear sub-frame module 12 is attached to the vehicle body 2, the stabilizer 29 is fixed to the vehicle body 2 directly by the holders 51 and the inner tubes 61 of the bushes 22 rather than via the elastically deformable bushes 22. Therefore, a reaction force acting on the components that support the stabilizer 29 is input directly into the vehicle body 2. As a result, when the vehicle body 2 rolls to the left and right, the stabilizer 29 and the suspensions 28 roll together with the vehicle body 2, and are therefore less likely to be affected by elastic deformation of the bushes 22. Since relative movement between the vehicle body 2 and the stabilizer 29 does not occur, the vehicle body 2 is less likely to roll to the left and right. The vehicle body 2 is therefore less likely to be affected by a rolling motion in a reverse rotation direction, which acts on the vehicle body 2 at a delay due to elastic deformation of the bushes 22. Hence, the vehicle body 2 is less likely to roll to the left and right than when the stabilizer 29 is supported by the sub-frame 21.

According to this implementation, therefore, rolling of the vehicle body 2 can be suppressed effectively while preventing a reduction in the productivity of the vehicle body 2.

In a case where the holders 51 holding the stabilizer 29 are supported by the sub-frame 21, on the other hand, as in the comparative example, the holders 51 holding the stabilizer 29 are attached to the vehicle body 2 via the elastically deformable bushes 22 in a condition where the rear sub-frame module 12 is attached to the vehicle body 2. Hence, when the vehicle body 2 rolls to the left and right, the stabilizer 29 and the suspensions 28 are directly affected by the elastic deformation of the bushes 22. Accordingly, when the vehicle body 2 rolls to the left and right, the vehicle body 2 moves relative to the stabilizer 29 due to the elastic deformation of the bushes 22, whereby the vehicle body 2 is more likely to roll to the left and right than the stabilizer 29. As a result, the roll angle of the vehicle body 2 cannot be suppressed effectively. Further, due to the force input into the stabilizer 29 as the vehicle body 2 rolls, the stabilizer 29 and the sub-frame 21 are more likely to start rotating in an opposite direction to the rolling vehicle body 2. As a result of this reverse rotary movement of the sub-frame 21, which is generated at a delay during rolling, the roll angle of the vehicle body 2 varies in a complicated manner during rolling. As a result, the rolling vehicle body 2 cannot easily be stabilized at an initial roll angle.

Furthermore, in this implementation, the rear sub-frame module 12 includes the brackets 91 supported by the inner tubes 61 of the bushes 22 and attached to the vehicle body 2 together with the inner tubes 61, and the holders 51 holding the stabilizer 29 are attached to the brackets 91. Therefore, the holders 51 holding the stabilizer 29 can be supported by the inner tubes 61 of the bushes 22.

Hence, by attaching the inner tubes 61 of the bushes 22 to the vehicle body 2 or attaching the brackets 91 to the vehicle body 2 together with the inner tubes 61 during the step for fixing the inner tubes 61 of the bushes 22 to the vehicle body 2, the stabilizer 29 can be fixed directly to the vehicle body 2.

Moreover, in this implementation, the brackets 91 are supported by the tubular inner tubes 61 attached to the vehicle body 2. Hence, the positions of the stabilizer 29, the holders 51, and the brackets 91 in the rear sub-frame module 12 are fixed before the rear sub-frame module 12 is attached to the vehicle body 2. Therefore, there is no need to adjust the positions of the brackets 91 when fixing the tubular inner tubes 61 of the bushes 22 to the vehicle body 2. As a result, workability when attaching the inner tubes 61 to the vehicle body 2 can be improved.

In a case such as that of the comparative example, on the other hand, in which the brackets 91 are formed separately to the tubular inner tubes 61 and attached to the vehicle body 2 so as to overlap the inner tubes 61, an operator must adjust the positions of the brackets 91 relative to the inner tubes 61 and maintain those positions during the attachment operation to ensure that the brackets 91 overlap the inner tubes 61. Since the stabilizer 29 is attached to the brackets 91, it is particularly difficult to adjust and maintain the positions of the brackets 91 after the brackets 91 deviate from the inner tubes 61.

Furthermore, in this implementation, each bracket 91 is attached integrally with the upper stopper 72 and lower stopper 77 that restrict the swinging range of the outer tube 62. Hence, the swinging range of the outer tube 62 within the bush 22 can be restricted favorably by the upper stopper 72 and lower stopper 77, and this stopper structure can be used favorably to support the stabilizer 29, the holder 51, and the bracket 91 in relation to the inner tube 61 disposed inside the outer tube 62 in the bush 22.

In particular, by attaching the bracket 91 integrally with the upper stopper 72 and lower stopper 77, relative lateral deviation between the upper stopper 72 and lower stopper 77 can be suppressed. As a result, it is possible to suppress a force that may act on the attachment member 81 inserted into the tubular inner tube 61 when the upper stopper 72 and the lower stopper 77 deviate laterally relative to each other so as to knock down the attachment member 81. The force that acts on the stabilizer 29 passes through the bracket 91 so as to act on the upper stopper 72 and lower stopper 77, but a force for knocking down the attachment member 81 is less likely to act thereon.

Further, the inner tube 61 of the bush 22 is press-fitted between the upper stopper 72 and the lower stopper 77, and therefore the bracket 91 can be prevented from falling away from the inner tube 61 of the bush 22 in the rear sub-frame module 12 prior to attachment to the vehicle body 2. Hence, the stabilizer 29 can be positioned relative to the inner tube 61.

Moreover, in this implementation, the holder 51 holding the stabilizer 29 and the bracket 91 are provided in a plurality of sets, and the plurality of brackets 91 are connected to each other by the connecting member 83 extending in the left-right direction. Accordingly, the respective brackets 91 are unlikely to rotate about the bushes 22. As a result, the brackets 91 can easily be stabilized and maintained in a predetermined attitude.

When, on the other hand, the plurality of brackets 91 are provided individually without being connected to each other by the connecting member 83, for example, the respective brackets 91 are likely to rotate about the corresponding bushes 22. As a result, the brackets 91 must be held so as not to deviate from a desired orientation (attitude) when attaching the inner tubes 61 of the bushes 22 to the vehicle body 2. In this implementation, there is no need to hold the brackets 91 manually, and therefore the brackets 91 can be attached to the vehicle body 2 in a desired attitude without holding the brackets 91 such that a desired characteristic can be obtained in the stabilizer 29.

Furthermore, in this implementation, the suspensions 28 are attached to the rear sub-frame module 12. The suspensions 28 can therefore be attached to the vehicle body 2 together with the rear sub-frame module 12. Hence, there is no need to attach the suspensions 28 to the rear sub-frame module 12 when the rear sub-frame module 12 is attached to the vehicle body 2.

The implementation described above is a preferred example of an implementation of the present invention, but the present invention is not limited thereto, and may be subjected to various amendments and modifications within a scope that does not depart from the spirit of the invention.

For example, in the above implementation, the bracket 91 is integrated with both the upper stopper 72 and the lower stopper 77 that restrict the swinging range of the outer tube 62.

Alternatively, the bracket 91 may have a cantilever structure so as to be integrated with only one of the upper stopper 72 and the lower stopper 77.

Figure 7A:
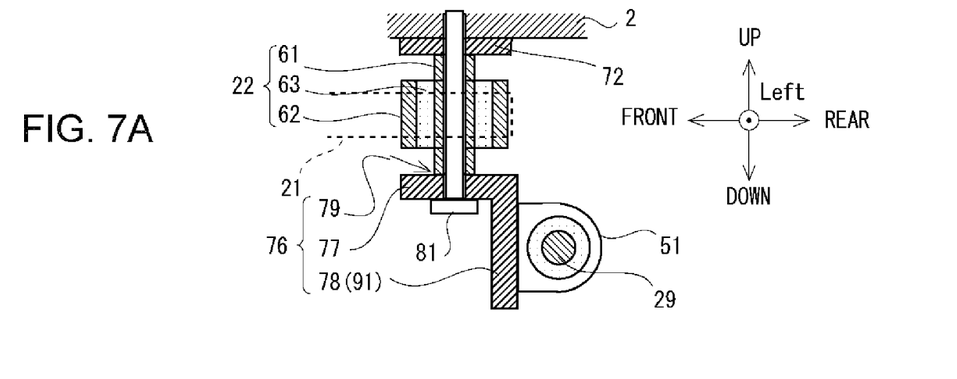
FIGS. 7A-7C are schematic partial longitudinal sectional views illustrating a modified example of a support structure for the stabilizer.
Figure 7B:
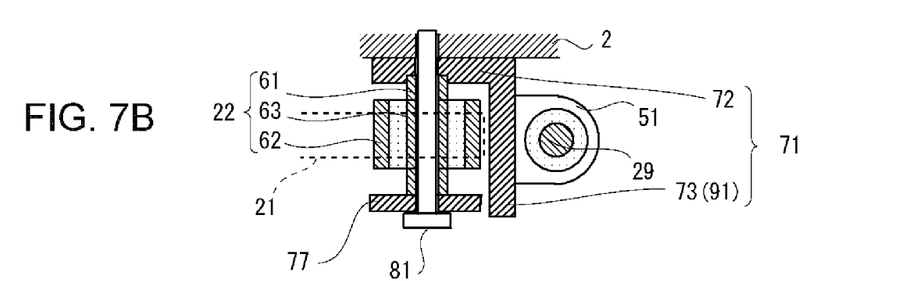
Figure 7C:
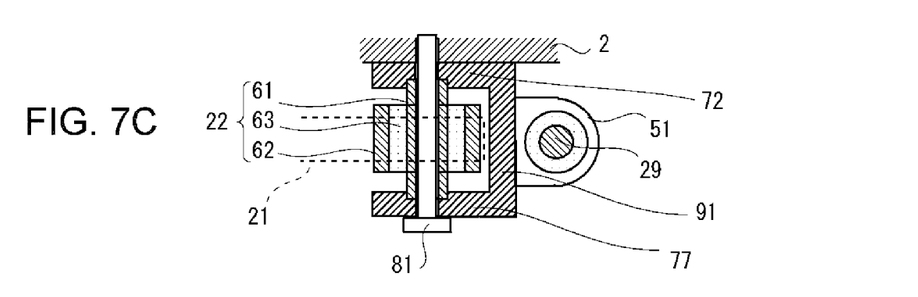

FIGS. 7A-7C are schematic partial longitudinal sectional views illustrating a modified example of a support structure for the stabilizer 29.

In FIG. 7A, the bracket 91 is constituted only by the lower bracket portion 78 integrated with the lower stopper 77.

In FIG. 7B, the bracket 91 is constituted only by the upper bracket portion 73 integrated with the upper stopper 72.

It should be noted, however, that with these cantilever structures, a force for knocking down the attachment member 81 inserted into the inner tube 61 of the bush 22 is more likely to act thereon.

Hence, a double supported structure such as that of the above implementation is preferably employed. Further, as illustrated in FIG. 7C, the bracket 91 may be integrated with both the upper stopper 72 and the lower stopper 77 such that an overall shape thereof has a substantially C-shaped cross-section.

Further, the bracket 91 may be provided separately to the upper stopper 72 and the lower stopper 77 and fixed to the vehicle body 2 so as to overlap the upper stopper 72 or the lower stopper 77, for example. In this case, the bracket 91 is formed separately to the inner tube 61 and attached to the vehicle body 2 together with the inner tube 61.

Note that with the cantilever structure of FIG. 7A or FIG. 7B, the bracket 91, or the upper stopper 72 or lower stopper 77 to which the bracket 91 is attached, may be attached directly to the vehicle body 2 separately to the inner tube 61 of the bush 22. In so doing, a force for knocking down the attachment member 81 is less likely to act thereon. In the vehicle body 2, however, many components, such as the suspensions 28, a muffler, the tire houses 13, a tank, various pipes, and a differential mechanism, are provided around the attachment positions of the bushes 22. In the vehicle body 2, therefore, it is not easy to secure locations for directly attaching the brackets 91, the upper stoppers 72, and the lower stoppers 77. Hence, a double supported structure such as that of the above implementation is preferable.

In the above implementation, the inner tube 61 and outer tube 62 of the bush 22 are formed in a cylindrical shape so that the attachment member 81 for attaching the sub-frame 21 to the vehicle body 2 can be inserted therein. Alternatively, for example, the bush 22 may be structured such that the elastic member 63 is charged between a flat plate-shaped vehicle body side member and a flat plate-shaped sub-frame side member. Likewise with this structure, the bush 22 is capable of elastic deformation in at least the up-down direction.

In the above implementation, the left and right brackets 91 are connected to each other by the connecting member 83.

Alternatively, for example, the left and right brackets 91 may be formed individually. In this case, detent processing may be performed on the individual brackets 91. For example, an inner shape of the upper recess 74 of the upper stopper integrated with the upper bracket portion 73 and an outer shape of the inner tube 61 of the bush 22 may be polygonal, or a key groove may be formed therein. Further, an inner shape of the lower recess 79 of the lower stopper integrated with the lower bracket portion 78 and the outer shape of the inner tube 61 of the bush 22 may be made polygonal, or a key groove may be formed therein.

In the above implementation, the inner tube 61 of the bush 22 is press-fitted between the upper stopper 72 and the lower stopper 77.

Alternatively, for example, the upper stopper 72 and the lower stopper 77 may be welded or the like to the upper and lower ends of the inner tube 61.

Further, the inner tube 61 may be fixed to the upper stopper 72 and the lower stopper 77 by a clip, a screw, a bolt, or the like so as to be simply sandwiched between the upper stopper 72 and the lower stopper 77. To stop the bracket 91 rotating in this case, the inner shape of the upper recess 74 of the upper stopper 72 integrated with the upper bracket portion 73 and the outer shape of the inner tube 61 of the bush 22 may be made polygonal, or a key groove may be formed therein, for example.

In the above implementation, the holder 51 holding the stabilizer 29 is attached to the inner tube 61, by which the bush 22 is attached to the vehicle body 2, via the bracket 91, the upper stopper 72, and the lower stopper 77.

Alternatively, for example, the bracket 91 may be attached directly to the inner tube 61. Further, the holder 51 may be attached directly to the inner tube 61.

In the above implementation, the stabilizer 29 is attached to the vehicle body 2 in the attachment positions of the bushes 22.

Alternatively, for example, the stabilizer 29 may be attached to the vehicle body 2 in a position other than the attachment positions of the bushes 22. For example, a central part of the stabilizer 29 may be attached to the vehicle body 2. In this case, the stabilizer 29 may be attached either to the connecting member 83, for example, or directly to the vehicle body 2.

Even when the stabilizer 29 is attached directly to the vehicle body 2 in this manner, by holding the left and right ends of the stabilizer 29 in advance using the inner tubes 61 of the bushes 22, as in the above implementation, the stabilizer 29 can be positioned in the attachment position relative to the vehicle body 2 simply by attaching the rear sub-frame module 12 to the vehicle body 2. The operator can therefore attach the stabilizer 29 to the vehicle body 2 easily after attaching the rear sub-frame module 12 to the vehicle body 2 without expending effort on holding the stabilizer 29 in the attachment position.

The above implementation is an example in which the present invention is applied to the upper arm type wishbone rear sub-frame module 12.

However, likewise in a five link type rear sub-frame module or a radius arm type rear sub-frame module, or the like, for example, the left and right rear wheels 4 are attached to the vehicle body 2 by a rear sub-frame module, and therefore the present invention may also be applied thereto. The rear sub-frame module to which the present invention can be applied is not limited to a specific type of suspension.

The invention claimed is:

1. A vehicle in which left and right wheels are attached to a vehicle body by a sub-frame module, comprising:
   a vehicle body and a sub-frame module attached to the vehicle body, wherein
   a set of left and right wheels in pair is attached to the vehicle body by interposing the sub-frame module,
   the sub-frame module includes:
      a sub-frame attached to the vehicle body;
      left and right hub carriers to which the left and right wheels in pair are respectively attached;
      left and right link arms that extend leftward and rightward from the sub-frame and connect the left and right hub carriers to left and right sides of the sub-frame to be capable of swinging;
      a stabilizer attached so as to lie across the left and right hub carriers or the left and right link arms;
      a holder that holds the stabilizer; and
      a bush that is capable of elastic deformation, provided in a plurality disposed on the sub-frame in a left-right direction, and interposed between the sub-frame and the vehicle body in a position where the sub-frame is attached to the vehicle body, the bush includes a vehicle body side member that is fixed to the vehicle body when the sub-frame is attached to the vehicle body, and the holder holding the stabilizer is provided in a plurality of sets corresponding to the bushes disposed in the left-right direction, supported by the vehicle body side member of the bush provided on the sub-frame module, and fixed to the vehicle body by attaching the vehicle body side member to the vehicle body.

2. The vehicle in which left and right wheels are attached to a vehicle body by a sub-frame module according to claim 1, further comprising:

a bracket that is provided in a plurality of sets corresponding to the bushes disposed in the left-right direction, and supported by the vehicle body side member of the bush or is attached to the vehicle body together with the vehicle body side member, wherein the holders holding the stabilizer are attached to the brackets.

3. The vehicle in which left and right wheels are attached to a vehicle body by a sub-frame module according to claim 2, wherein the vehicle body side member provided in the bush and attached to the vehicle body has a tubular shape into which an attachment member for attaching the sub-frame to the vehicle body can be inserted, the bush further includes an outer tube disposed around the tubular vehicle body side member, and an elastic member that is charged between the tubular vehicle body side member and the outer tube so as to integrate the vehicle body side member with the outer tube, and the bracket is supported by the tubular vehicle body side member.

4. The vehicle in which left and right wheels are attached to a vehicle body by a sub-frame module according to claim 3, wherein the tubular vehicle body side member projects above and below the outer tube, at least either one of an upper stopper provided on an upwardly projecting upper end of the tubular vehicle body side member in order to restrict upward swinging of the outer tube, and a lower stopper provided on a downwardly projecting lower end of the tubular vehicle body side member in order to restrict downward swinging of the outer tube is provided, and the bracket is attached to at least one of the provided upper stopper and lower stopper.

5. The vehicle in which left and right wheels are attached to a vehicle body by a sub-frame module according to claim 4, wherein both the upper stopper and the lower stopper are provided, and the bracket is attached to each of the upper stopper and the lower stopper.

6. The vehicle in which left and right wheels are attached to a vehicle body by a sub-frame module according to claim 5, further comprising left and right suspensions that stand upright on the left and right hub carriers or the left and right link arms such that respective upper ends thereof are attached to the vehicle body.

7. The vehicle in which left and right wheels are attached to a vehicle body by a sub-frame module according to claim 5, wherein the brackets are connected to each other by a connecting member that extends in the left-right direction.

8. The vehicle in which left and right wheels are attached to a vehicle body by a sub-frame module according to claim 4, further comprising left and right suspensions that stand upright on the left and right hub carriers or the left and right link arms such that respective upper ends thereof are attached to the vehicle body.

9. The vehicle in which left and right wheels are attached to a vehicle body by a sub-frame module according to claim 4, wherein the brackets are connected to each other by a connecting member that extends in the left-right direction.

10. The vehicle in which left and right wheels are attached to a vehicle body by a sub-frame module according to claim 3, wherein the brackets are connected to each other by a connecting member that extends in the left-right direction.

11. The vehicle in which left and right wheels are attached to a vehicle body by a sub-frame module according to claim 3, further comprising left and right suspensions that stand upright on the left and right hub carriers or the left and right link arms such that respective upper ends thereof are attached to the vehicle body.

12. The vehicle in which left and right wheels are attached to a vehicle body by a sub-frame module according to claim 2, wherein the brackets are connected to each other by a connecting member that extends in the left-right direction.

13. The vehicle in which left and right wheels are attached to a vehicle body by a sub-frame module according to claim 2, further comprising left and right suspensions that stand upright on the left and right hub carriers or the left and right link arms such that respective upper ends thereof are attached to the vehicle body.

14. The vehicle in which left and right wheels are attached to a vehicle body by a sub-frame module according to claim 1, wherein:

brackets are provided in a plurality of sets corresponding to the bushes disposed in the left-right direction, and wherein the brackets are connected to each other by a connecting member that extends in the left-right direction.

15. The vehicle in which left and right wheels are attached to a vehicle body by a sub-frame module according to claim 14, further comprising left and right suspensions that stand upright on the left and right hub carriers or the left and right link arms such that respective upper ends thereof are attached to the vehicle body.

16. The vehicle in which left and right wheels are attached to a vehicle body by a sub-frame module according to claim 1, further comprising left and right suspensions that stand upright on the left and right hub carriers or the left and right link arms such that respective upper ends thereof are attached to the vehicle body.

* * * * *